United States Patent [19]
Amit et al.

[11] Patent Number: 5,659,701
[45] Date of Patent: Aug. 19, 1997

[54] APPARATUS AND METHOD FOR DISTRIBUTED PROGRAM STACK

[75] Inventors: Neta Jacob Amit; John Michael Marberg, both of Haifa; Uri Shani, Adi, all of Israel

[73] Assignee: International Business Machines Corporation, Armonk, N.Y.

[21] Appl. No.: 245,052

[22] Filed: May 17, 1994

Related U.S. Application Data

[63] Continuation of Ser. No. 801,149, Dec. 2, 1991, abandoned.
[51] Int. Cl.$^6$ ............................................. G06F 15/16
[52] U.S. Cl. ...................... 395/684; 395/680; 395/200.31
[58] Field of Search ..................... 364/DIG. 1, DIG. 2; 395/200, 650, 700, 200.03, 680, 684

[56] References Cited

U.S. PATENT DOCUMENTS

| | | | |
|---|---|---|---|
| 4,274,139 | 6/1981 | Hodgkinson et al. | 364/200 |
| 4,500,960 | 2/1985 | Babecki et al. | 364/200 |
| 4,530,051 | 7/1985 | Johnson et al. | 364/200 |
| 4,564,903 | 1/1986 | Guyette et al. | 364/300 |
| 4,882,674 | 11/1989 | Quint et al. | 364/200 |
| 4,901,231 | 2/1990 | Bishop et al. | 364/200 |
| 4,924,384 | 5/1990 | Hao et al. | 364/300 |
| 5,089,954 | 2/1992 | Rago | 395/600 |
| 5,247,676 | 9/1993 | Ozur et al. | 395/650 |

FOREIGN PATENT DOCUMENTS

| | | | |
|---|---|---|---|
| 2061117 | 6/1993 | Canada | G06F 15/16 |
| 0358620 | 3/1990 | European Pat. Off. | G06F 9/40 |
| 1242989 | 8/1971 | United Kingdom | G06F 9/06 |

OTHER PUBLICATIONS

"Operating Systems: A Systematic View" by W.S. Davis, Addison-Wesley Publ. Co., 1987, pp. 19, 25–26.
Journal of Parallel and Distributed Computing II (1991) Mar., No. 3, Duluth, MN., US, "The Design of a Stub Generator for Heterogeneous RPC Systems" by Yi-Hsiu Wei, Alexander D. Stoyenko, and German S. Goldszmidt (pp. 188–197).

(List continued on next page.)

Primary Examiner—Kevin A. Kriess
Assistant Examiner—Kakali Chaki
Attorney, Agent, or Firm—Roy W. Truelson; Steven W. Roth

[57] ABSTRACT

A multi-processor computer system executes a single-thread program having a plurality of callable procedures. The local memory of each processor contains a program stack, the object code of each procedure that executes on that processor, and an agent object. In addition, the local memory contains a c-stub module for each procedure executable on a different processor, and a s-stub module for each local procedure that can be called by a remote procedure. When a procedure P1 executing on processor A calls a procedure P2 which executes in processor B, it issues a local call to P2's c-stub in processor A's local memory. The P2 c-stub then invokes the agent process in processor A, which communicates with a corresponding agent process in processor B. The agent process in processor B causes P2's s-stub in processor B to issue a local call to procedure P2. The return from a procedure follows the same path in reverse. Each processor independently maintains its own version of the program stack, with stack entries referencing the locally executable procedures, local stubs, or local agents. As a result, remote procedure calls are not constrained by the past calling history of a process. A procedure P1 in processor A may call a procedure P2 in processor B, which may in turn call another procedure P3 in processor A. It is therefore possible to convert a conventional single-thread program for operation on a multi-processor system without any significant modification to the source code.

31 Claims, 9 Drawing Sheets

OTHER PUBLICATIONS

ACM Transactions on Computer Systems, vol. 2, No. 1, Feb. 1984, pp. 39–59, New York, NY, US, "Implementing Remote Procedure Calls" by Andrew D. Birrell and Bruce Jay Nelson, Zerox Palo Alto Research Center.

IBM Technical Disclosure Bulletin vol. 23 No. 5 Oct. 1980 "Distributed Data Processing System" by R. R. Marsicek, et al.

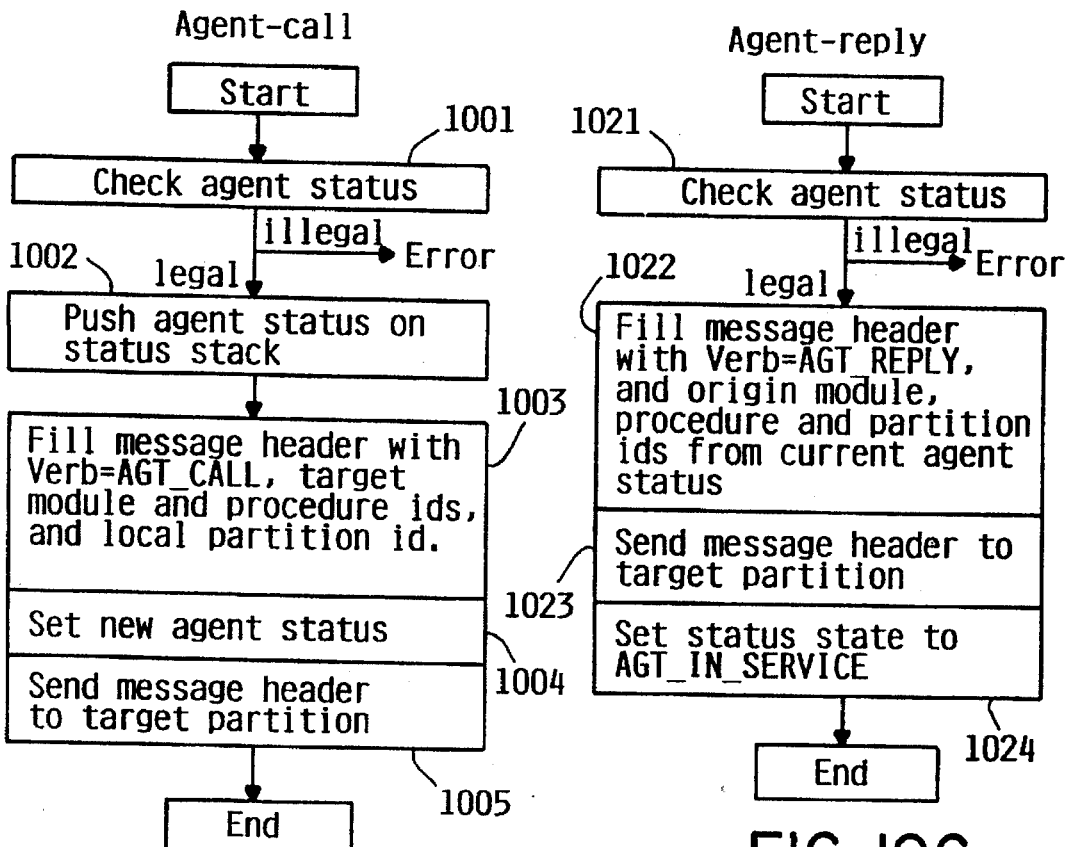
FIG. 10A
FIG. 10C
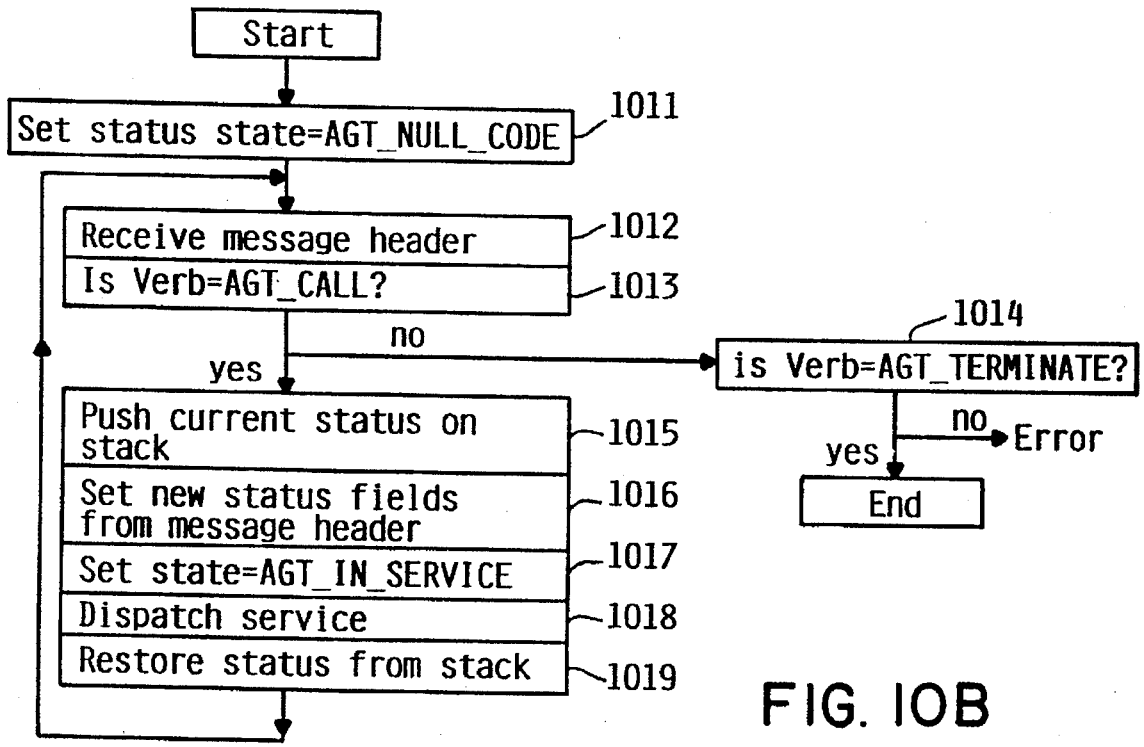
FIG. 10B (a) Beginning of Gather cycle (b) End of Gather cycle

APPARATUS AND METHOD FOR DISTRIBUTED PROGRAM STACK

This application is a continuation of application Ser. No. 07/801,149, filed Dec. 2, 1991, now abandoned.

FIELD OF THE INVENTION

The present invention relates to data processing software usage, and in particular to efficiently executing a single-thread computer program on more than one processor.

BACKGROUND OF THE INVENTION

A modern computer system typically comprises a single central processing unit (CPU), and other supporting hardware such as system memory, communications busses, input/output controllers, storage devices, etc. The CPU is the heart of the system. It executes the instructions which comprise a computer program and directs the operation of the other system components.

In the early years of computer development, the CPU was the most expensive part of the system. As a result, systems were constructed around the CPU, to optimize its usage. Multi-tasking systems, capable of serving a number of users performing various tasks simultaneously, were a result of this development history. Multi-tasking allows multiple users and tasks to share the CPU. Although the system may be capable of serving a number of users performing various tasks simultaneously, only one task can be running in the CPU at any instant in time. If a particular task needs the CPU and the CPU is busy, the task must wait. Thus, while multi-tasking permits greater utilization of the CPU, it also means that the CPU is more likely to be a bottleneck to overall system performance.

With the advent of integrated circuits, the cost of processors relative to other system components has declined. As a result, computer systems are being designed with more processors. For example, it has been standard for a number of years to perform certain low level peripheral functions in slave processors, such as disk drive controller processors, workstation controller processors, etc. As the relative cost of such peripheral processors has declined, system designers have expanded their use, reducing the workload burden on the CPU.

In recent years, this availability of inexpensive processors has led to the development of parallel and distributed processing systems, containing multiple processors performing the functions traditionally performed by a single CPU. The processors in such a multi-processor system have separate address spaces, and may have their own storage and their own internal data bus and I/O. The processors may be coupled through shared bus and shared memory, or more loosely via communication networks or other I/O controllers.

A special case of such a multi-processor system is the use of a numeric-intensive co-processor with a general purpose main processor. The architecture of the numeric-intensive co-processor is optimized for performing applications requiring intensive computation (usually floating point), while the main processor is optimized for handling a typical instruction mix of data moves, compares, I/O, etc.

One of the problems with such multi-processor systems is that most programs designed for execution on a computer system are inherently single-thread. As used herein, "single-thread" means that the program contains a single flow of control, whereby at any instant in time, a single sequence of instructions is executing. Such a sequence may loop or jump to a different point in the code, but it always follows a single path. Such a single-thread program is to be distinguished from multiple threads of control, in which program flow may divide, as a road does at a fork, and proceed down both paths simultaneously. A single-thread program does not adapt well to execution on multiple processors.

Where a single-thread program is to be executed on a multi-processor system containing different types of processors, portions of the program must be allocated to the different processors for execution. One alternative is to re-write single-thread code to support a different flow of control, enabling optimization of multiple processors. Certain computer languages support such multi-processing, although only a small fraction of existing computer programs are written in these languages. For example, the SIMULA language supports the use of co-routines, which enable multiple simultaneous threads of program execution. However, this solution is not always possible, and even where possible, re-writing existing code tends to be very expensive.

Another method for allocating portions of a program to multiple processors is the client-server model, which is commonly used in distributed processing systems. Each program part executes on some processor (the client). When it needs the services of another processor (the server), which has different capabilities than the client processor, it issues a request that the server do some work on its behalf. The server returns control to the client when done, along with the results of its work if required. The client-server model allows different processors to cooperate in executing a program, but the degree of cooperation is constrained. The client must provide all information that may be needed to the server before it begins execution, usually before it knows what information will be needed. Existing client-server models are unidirectional in nature; the server lacks capability to issue a call back to the client.

It is desirable to allocate different parts of a program to different processors in a multi-processor system without extensive alteration to the code. In particular, in the case of a system having a general purpose main processor and a numeric-intensive co-processor, it is desirable to execute the numeric-intensive procedures on the co-processor, and other procedures on the main processor. Unfortunately, prior art mechanisms restrict the ability of the system to allocate procedures in an optimal fashion.

It is therefore an object of the present invention to provide an enhanced method and apparatus for executing programs on a multi-processor computer system.

Another object of this invention is to provide an enhanced method and apparatus for allocating portions of a program to different processors in a multi-processor computer system.

Another object of this invention is to increase the flexibility of allocating portions of a program to different processors in a multi-processor computer system.

Another object of this invention is to increase the efficiency of processes running on a multi-processor computer system.

Another object of this invention is to reduce the amount of alteration required of a single-thread program to enable it to run efficiently on a multi-processor computer system.

Another object of this invention is to reduce the cost of executing programs on a multi-processor computer system.

Another object of this invention to provide an enhanced method and apparatus for executing programs on a computer system comprising a general purpose processor and a numeric-intensive co-processor.

SUMMARY OF THE INVENTION

A computer program comprising a plurality of program modules, each module containing one or more callable procedures, executes on a multi-processor system. Each program module executes on one of the processors in the system, although any one processor may execute more than one module. The locally addressable memory of each processor contains a program stack, the object code of each module that executes on that processor, and an agent object and data structures containing linkage information for handling communications with the other processors. In addition, the local memory contains a c-stub module for each procedure executable on a different processor that can be called by one of the procedures in local memory, and a s-stub module for each procedure in local memory that can be called by a procedure executing on another processor. The set of program modules, stubs, stack and agent in the local memory of a processor is called a partition.

When a procedure P1 executing on processor A wishes to call a procedure P2 which executes in processor B, it issues a local call to the c-stub corresponding to P2 in processor A's locally addressable memory. The P2 c-stub then invokes the agent process in processor A, which communicates with a corresponding agent process in processor B. The agent process in processor B causes a s-stub in processor B corresponding to procedure P2 to issue a local call to procedure P2. The return from a procedure follows the same path in reverse. Each processor independently maintains its own version of the program stack, with stack entries referencing the locally executable procedures, local stubs, or local agents. With each local call or return, the program stack for that processor is updated appropriately. We call this mechanism a "distributed stack".

Because each processor independently maintains its own stack which references local procedures, stubs and agents, remote procedure calls are not constrained by the past calling history of a process, as they would be in the case of a typical prior art client-server model (which is uni-directional). A procedure P1 in processor A may call a procedure P2 in processor B, which may in turn call another procedure P3 in processor A. In the alternative, procedure P2 could recursively call procedure P1 in processor A.

In accordance with this invention, a conventional single-thread program written for execution on a uni-processor system can be converted to operation on a multi-processor system with little or no modification to the source code. With respect to each program module, a determination is made as to which processor in the system should execute the module. This determination is independent of the determinations made with regard to other modules. Stubs are generated automatically as required. All procedure calls appear local to the calling procedure, so that no modification of source is required to distinguish calls which are in fact local from remote procedure calls. A loader process automatically starts partitions on remote processors as required, and returns linkage information necessary to establish communications between different processors.

In the preferred embodiment, the multi-processor system comprises an IBM Application System/400 system processor coupled to an IBM RISC System/6000 system processor. The former processor is designed for general purpose commercial transaction processing, while the latter processor is a reduced instruction set (RISC) processor designed for scientific/engineering applications. The RISC processor acts as an accelerator for procedures containing numerically intensive operations, particularly substantial floating-point operations. In this preferred embodiment, procedures supporting general purpose commercial transactions execute on the general purpose processor, while procedures containing numerically intensive operations execute on the RISC processor.

BRIEF DESCRIPTION OF THE DRAWINGS

FIGS. 10A–10F are flowcharts of steps performed by agents according to the preferred embodiment;

DETAILED DESCRIPTION OF THE PREFERRED EMBODIMENT

Figure 1:
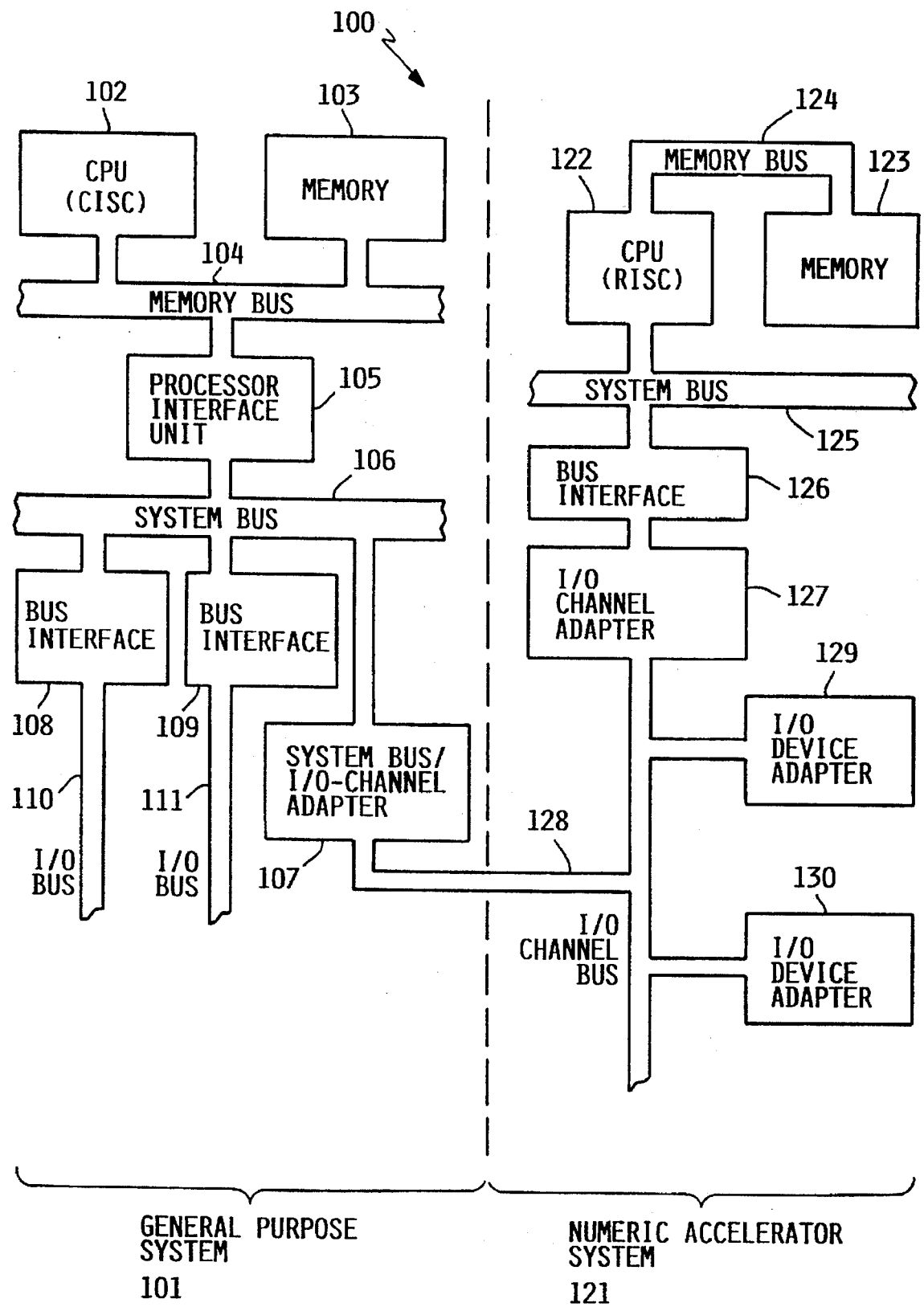
FIG. 1 shows the major hardware components of a multi-processor system for executing single-thread programs according to the preferred embodiment of this invention.

A diagram of the major hardware components of the multi-processor system according to the preferred embodiment of the present invention is shown in FIG. 1. Multi-processor system 100 comprises a general purpose commercial transaction system 101 coupled to a special purpose numeric accelerator system 121. General purpose system 101 is driven by a conventional complex instruction set (CISC) CPU 102. CPU 102 communicates with local memory 103 and processor interface unit 105 via memory bus 104. Processor interface unit 105 handles communications between memory bus 104 and system bus 106. System bus/I/O channel adapter 107 is attached to system bus 106. Additional bus interface devices 108,109 may be attached to system bus 106, permitting I/O devices (not shown) to communicate with system bus 106 via I/O busses 110, 111. Numeric accelerator system 121 is driven by reduced instruction set (RISC) CPU 122, which is designed for applications requiring intensive numeric computation, such as scientific/engineering applications. RISC CPU 122 communicates with local memory 123 via memory bus 124.

CPU 122 is also connected to system bus 125, allowing it to communicate with I/O channel adapter 127 via bus interface 126. I/O channel 128 establishes a connection between I/O channel adapter 127 and System bus/I/O channel adapter 107, and hence between general purpose system 101 and numeric accelerator system 121. I/O channel 128 can also attach a plurality of I/O devices (not shown) to system 121 via I/O device adapters 129,130. Although two I/O busses 110,111 and bus interface devices 108,109 are shown attached to system 101, and two I/O device adapters 129,130 are shown attached to system 121, it should be understood that the actual number of such devices attached to the systems may vary.

Local memory 103 is in the address space of CPU 102, and local memory 123 is in the address space of CPU 122. Although these local memories are shown as single units, it should be understood that the local memory of each processor may in fact be a hierarchy of memory devices, such as a small, relatively fast cache memory and a slower but larger main memory. It should also be understood that each system will typically include one or more local mass storage devices, such as magnetic disk drives, and have mechanisms for loading data from such mass storage devices into local memory as required. The use of such memory devices is well known in the art. For purposes of this invention, local memory may be viewed conceptually as a single unit in the address space of the respective processor.

In the preferred embodiment, system 101 is an IBM Application System/400 system, and system 121 is and IBM RISC System/6000 system. I/O channel 128 is an IBM Micro-Channel bus. System 121 functions primarily as a slave system, to improve the performance of system 101, which is the primary system. In this preferred embodiment, system 101 and system 121 are physically housed in the same unit and receive power from a common source. Housing the systems together enables data to be transferred between systems at a high rate. However, it should be understood that this invention could be practiced with other computer systems in other configurations, and that the systems would not necessarily have to be housed together in the same physical unit.

Figure 2:
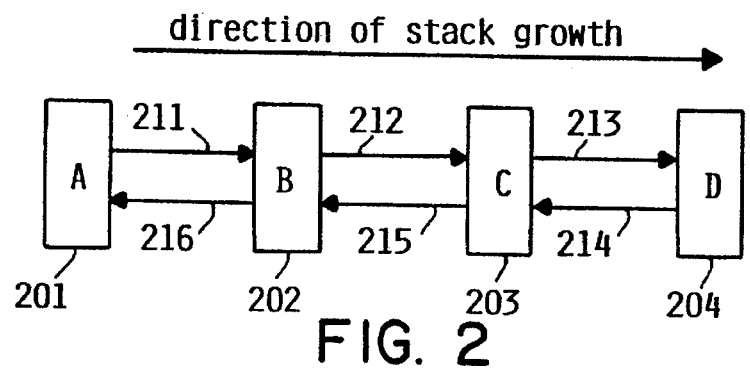
FIG. 2 shows how a conventional program executes a series of nested procedure calls in a uni-processor computer architecture.

A conventional single-thread computer program comprises a plurality of procedures which may call each other in a nested or recursive fashion. FIG. 2 illustrates a series of nested procedure calls for such a program in a conventional uni-processor computer architecture. In the example of FIG. 2, procedure A 201 issues a call 211 to procedure B 202, which transfers control to procedure B. Procedure B 202 then issues a call 212 to Procedure C 203 (before returning to Procedure A), which transfers control to Procedure C. Procedure C 203 issues a call 213 to Procedure D 204 (before returning to Procedure C). Procedure D returns control 214 to Procedure C when D is done executing. Procedure C later returns control 215 to Procedure B when C is done executing, and Procedure B returns control 216 to A when B is done executing. It is possible in such a conventional system for a procedure to call a previously called procedure, which is known as recursion. For example, Procedure C could have called Procedure B instead of procedure D, or could even have called itself. In a conventional uni-processor architecture, a data structure called a stack maintains state information needed to resume execution of the program at the proper place when a procedure returns to the procedure which called it. A stack comprises one or more procedure activation blocks, each block containing state information for some procedure, such as the next instruction to be executed, the state of local variables, etc. When a procedure is called, a new activation block is added to the stack and the called procedure's state information is saved. When a procedure returns, state information is read from the activation block and the top activation block on the stack is removed.

Figure 3:
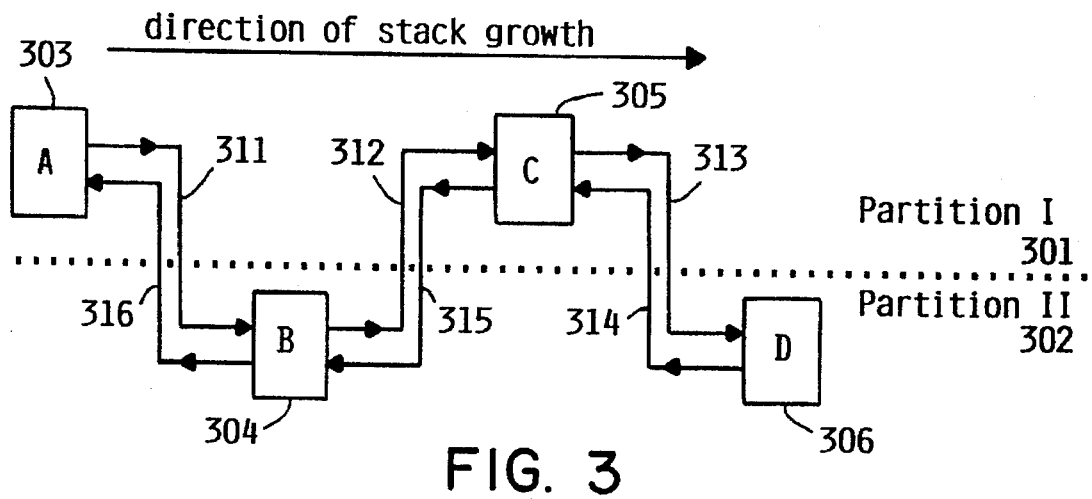
FIG. 3 shows how the conventional program of FIG. 2 would execute on a multi-processor system according to the preferred embodiment.

According to the present invention, the procedures which make up a program are allocated among a plurality of partitions, one partition for each separate processor. The partition in which the outer procedure of a program executes (i.e., in which a program begins execution) is called the main partition, and all other partitions are called secondary partitions. FIG. 3 illustrates conceptually how the program of FIG. 2 might execute on computer system 100, in which there are two partitions. In this example, Partition I 301 is the main partition, and Partition II 302 is a secondary partition. Procedure A 303 and Procedure C 305 have been allocated to Partition I, while Procedure B 304 and Procedure D 306 have been allocated to Partition II. When Procedure A issues a call 311 to Procedure B, the call crosses the partition boundary, and is therefore referred to as a "remote procedure call" Procedure B then issues a remote procedure call 312 to Procedure C, which in turn issues remote procedure call 313 to Procedure D. Procedure D returns 314 control to Procedure C when D is done executing, C returns 315 to B, and B returns 316 to A. Just as in the case of a uni-processor system, it is possible to call procedures recursively across partition boundaries. For example, Procedure C could have called Procedure B instead of Procedure D.

Procedures are allocated to partitions according to a variety of performance or other considerations. In the example of FIG. 3, procedures B and D may be numeric-intensive procedures which are allocated to a partition containing a RISC processor to utilize the processor's capabilities to perform complex calculations. Procedures A and C may be procedures with substantial I/O or other general instruction mix, which execute more efficiently on a general purpose CISC processor. However, other considerations are possible in allocating procedures. For example, in an alternative embodiment a distributed processing system may comprise a plurality of identical processors, each having different databases in its own local storage. In this case, procedures may be allocated to processors according to the databases they access.

The procedure issuing a remote procedure call is playing the role of a client. The procedure being called is playing the role of a server. A single procedure may play the role of client with respect to certain calls and server with respect to others. In the example of FIG. 3, Procedure A is a client when it issues remote procedure call 311, and Procedure B is the server with respect to that call. However, Procedure B is a client when it issues remote procedure call 312, and Procedure C is a server.

Figure 4:
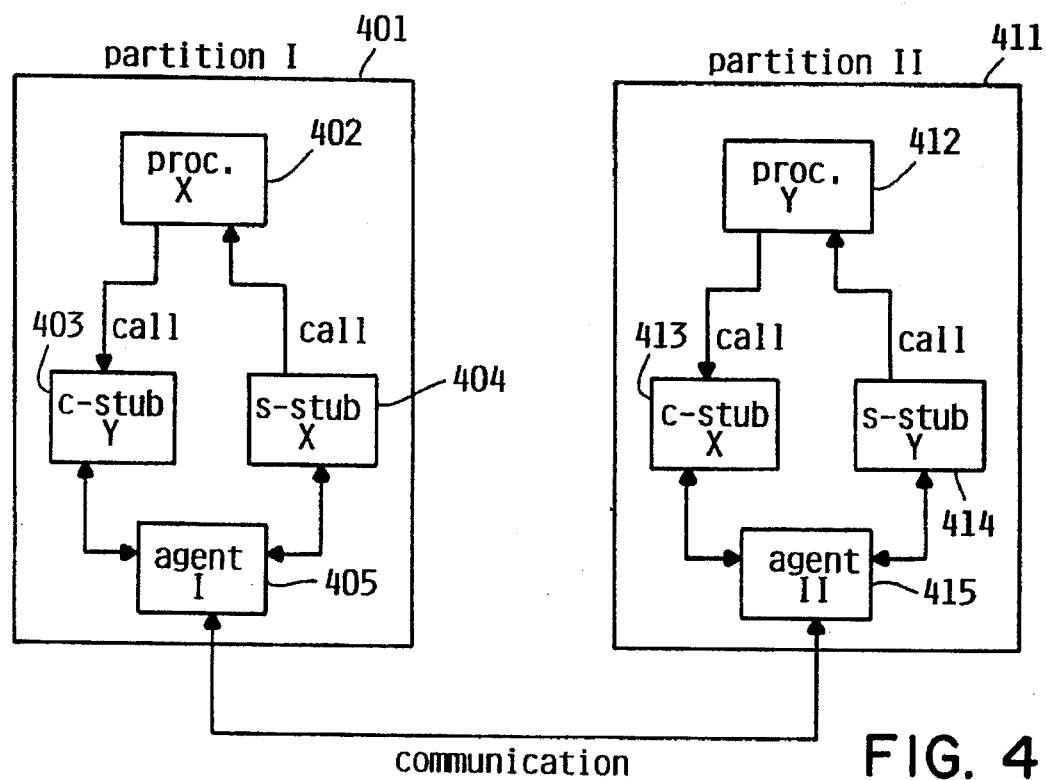
FIG. 4 shows the different units within partitions that participate in a remote procedure call according to the preferred embodiment.

FIG. 4 shows the different units of a partition and how they interact during a remote procedure call in the preferred embodiment. Each partition contains one or more procedure code blocks 402,412, one or more c-stubs 403,413, one or more s-stubs 404,414, and an agent 405,415. Procedure code blocks 402,412 contain the machine executable instructions for running the procedure. Each procedure code block may be a separately compiled module, or multiple blocks may be compiled in a single module within a partition. A compiled module is always contained within a single partition, whether it has only one or more than one procedure.

Referring to FIG. 4, if Procedure X 402 in partition 401 issues a call to procedure Y 412 in partition 411, the call is received by Procedure Y's c-stub 403 in partition 401. C-stub 403 calls its local agent 405, requesting it to invoke the remote server. Agent 405 issues a call across the partition boundary to agent 415. Agent 415 then calls Procedure Y's s-stub 414, which then issues a local call to Procedure Y which appears (from Procedure Y's perspective) to come from another local procedure. Procedure Y could call Procedure X via c-stub 413, agent 415, agent 415 and s-stub 404.

Stubs allow remote procedure calls to appear local to the calling procedure. It is, therefore, not necessary for a procedure issuing a call to know whether or not the called procedure is in the same partition. It simply issues a normal local procedure call regardless. A c-stub receives a local procedure call from a client procedure in the same partition as the c-stub on behalf of a server procedure in a different partition. A s-stub issues a local procedure call to a server procedure in the same partition as the s-stub on behalf of a client procedure in a different partition. For each procedure that may act as a server, there is a separate s-stub in the partition of the server, and a separate c-stub in each of the other partitions. Stubs are needed only for procedures which may play the role of a server.

Each partition has one agent, which handles the connections with other partitions. More precisely, the agent is responsible for the transfer of program control across the partition boundary. The agents of the different partitions communicate with each other over a communications medium, which in the preferred embodiment is the path running between system 101 and system 121 via I/O channel 128. The same agent in a given partition handles both the outgoing remote procedure calls and the incoming remote procedure calls. Thus, the agent is the junction through which the single thread of control leaves and returns to the local partition. Each agent has information on what servers can be dispatched locally in response to incoming remote calls, and how to route outgoing remote calls to servers in other partitions.

Each partition contains a separate local stack, containing activation blocks for procedures, stubs and agents in the partition. Together, the individual local stacks within the partitions contain all program state information necessary to maintain program flow. The inventors have designated this structure a "distributed stack".

Figure 5:
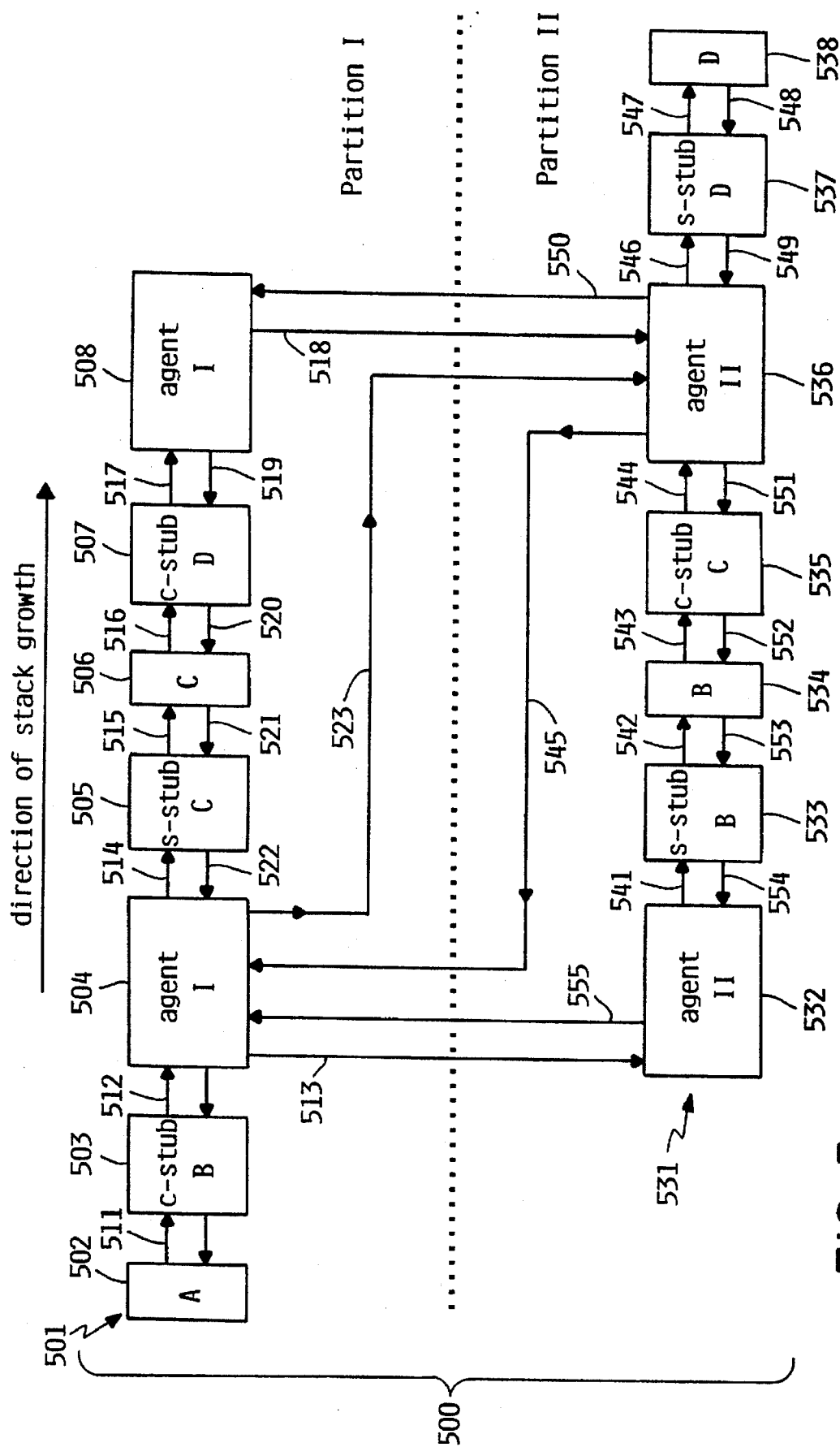
FIG. 5 shows a distributed stack according to the preferred embodiment.

FIG. 5 shows an example of such a distributed stack for the history of remote procedure calls depicted in FIG. 3. In this example, distributed stack 500 comprises two local stacks 501,521, contained in Partition I 301 and Partition II 302 of FIG. 3 respectively. Because Partition I is the main partition, the first entry at the bottom of stack 501 is the activation block for Procedure A. When procedure A is executing, and before it issues a call, this is the only activation block on stack 501. Stack 531 may or may not contain an activation block 532 for agent II in Partition II, depending on whether Partition II has yet been started, as will be discussed later. When Procedure A issues remote procedure call 311 to Procedure B, it in reality issues local call 511 to a c-stub for Procedure B in Partition I, causing c-stub activation block 503 to be placed on stack 501. Procedure B's c-stub then calls 512 Partition I's agent (Agent I), causing Agent I activation record 50 to be placed on stack 501. Agent I then communicates 513 with Agent II. If Partition II has not yet been started, a load/start utility will be invoked to start Partition II as described later. Load/start utility will initialize stack 531 and place activation block 532 for Agent II at the bottom of the stack. Agent II then calls 541 Procedure B's s-stub, causing s-stub activation block 533 to be placed on stack 531. Procedure B's s-stub then calls 542 Procedure B, causing Procedure B's activation block 534 to be placed on stack 531. Thus, remote procedure call 311 which is shown in FIG. 3 as a single conceptual remote call, in fact comprises the series of local calls 511, 512, 541 and 542, and the remote call 513 between agents. When Procedure B is executing, and before it calls another procedure, stack 501 contains activation blocks for Procedure A 502, B's c-stub 503 and Agent I 504, while stack 531 contains activation blocks for Agent II 532, B's s-stub 533 and Procedure B 534.

Distributed stack 500 grows similarly for the remaining remote procedure calls shown in FIG. 3. In order for Procedure B to issue remote procedure call 312 to Procedure C, Procedure B calls 543 C's c-stub in Partition II, adding activation block 535 to stack 531; C's c-stub calls 544 Agent II, adding activation block 536 to stack 531; Agent II communicates 545 with Agent I; Agent I calls 514 C's s-stub in Partition I, adding activation block 505 to stack 501; and C's s-stub calls 515 Procedure C, adding activation block 506 to stack 501. When Procedure C issues remote procedure call 313 to Procedure D, Procedure C calls 516 D's c-stub in Partition I, adding activation block 507 to stack 501; D's c-stub calls 517 Agent I, adding activation block 508 to stack 501; Agent I calls 518 Agent II; Agent II calls 546 D's s-stub in Partition II, adding activation block 537 to stack 531; and D's s-stub calls 547 Procedure D, adding activation block 538 to stack 531. When Procedure D is executing, distributed stack 500 contains all activation blocks shown in FIG. 5.

The returns from procedures follow the same sequence in reverse. When Procedure D is finished executing, it returns to Procedure C (shown in FIG. 3 as the single return 314) by returning 548 to D's s-stub, causing D's activation block 538 to be removed from stack 531; D's s-stub returns 549 to Agent II and activation block 537 is removed from stack 531; Agent II communicates 550 with Agent I; Agent I returns 519 to D's c-stub and activation block 508 is removed from stack 501; and D's c-stub returns 520 to Procedure C, removing block 507 from stack 501. Note that the activation block 536 for Agent II is not removed from the stack when returning across the partition boundary, because Agent II will be needed again as the entry point when control re-crosses the boundary. Procedure C returns to Procedure B by the successive returns to C's s-stub 521, Agent I 522, Agent II 523, C's c-stub 551 and Procedure B 552, during which activation blocks 506, 505, 536 and 535 are removed from their respective stacks. Procedure B returns to Procedure A by the successive returns to B's s-stub 553, Agent II 554, Agent I 555, B's c-stub 524 and Procedure A 525, during which activation blocks 534, 533, 504 and 503 are removed from their respective stacks.

Figure 6:
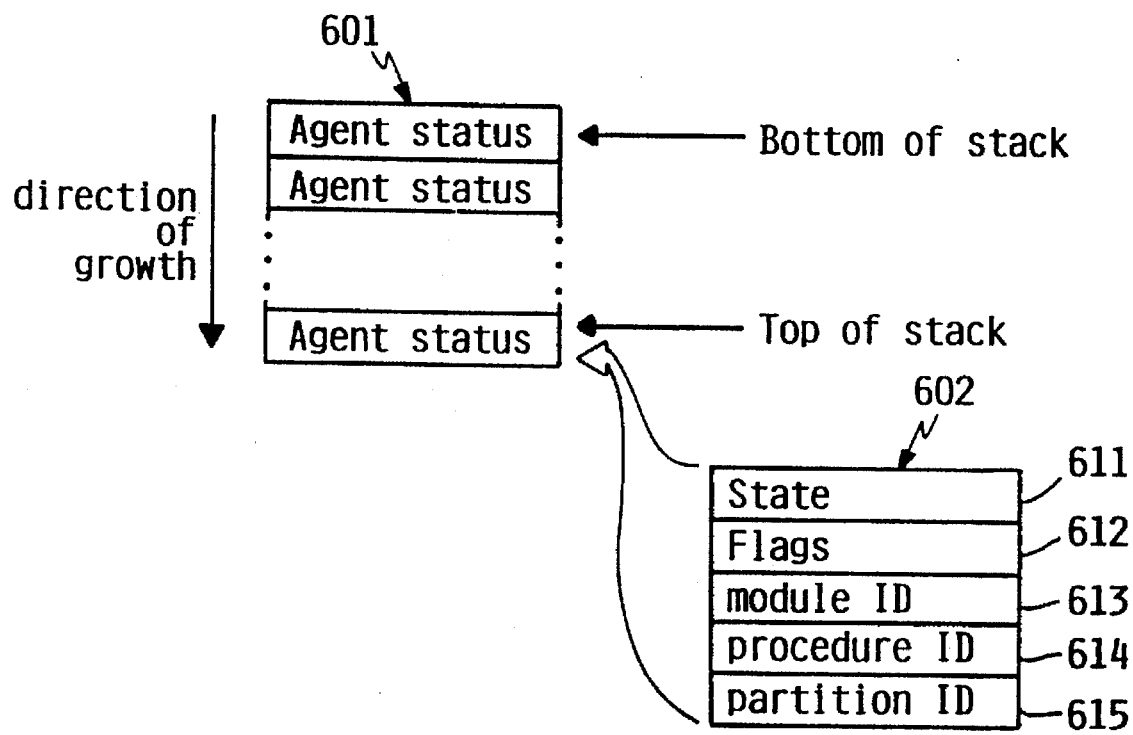
FIG. 6 shows the structure of an agent status stack according to the preferred embodiment.

Each agent maintains an internal agent status stack. The structure of the agent status stack is shown in FIG. 6. The agent status stack 601 records agent status, enabling the agent to resume execution at the proper place when control is passed to the agent as a result of a call or return. Stack 601 comprises one or more agent status records 602, each record containing a state field 611, flag field 612, module identifier 613, procedure identifier 614 and partition identifier 615. State field 611 contains the current state of the agent, e.g. AGT_IN_SERVICE, AGT_CALL, AGT_RETURN, etc. Flag field 612 is a bit vector signalling various run-time conditions. Module identifier field 613, procedure identifier field 614, and partition identifier field 615 contain an identifying number of the module, procedure and partition, respectively, of the procedure being called by the agent, whether the call is local on behalf of a remote procedure or remote on behalf of a local procedure. On calling a remote server (on behalf of a local client), current status is pushed on stack 601 and updated to reflect the new state of the agent. When the remote call is returned, old status is restored (popped) off the top of the stack. On receiving a remote request (on behalf of a local server), current status is pushed on stack 601 before local service is invoked, and restored (popped) off the top of stack on service completion.

Figure 7:
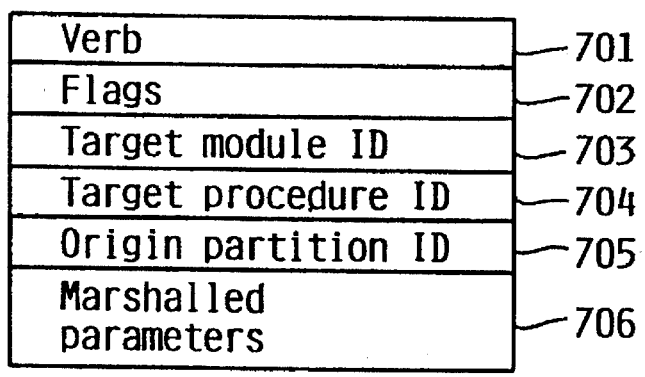
FIG. 7 shows the structure of a message between agents according to the preferred embodiment.

FIG. 7 shows the format of inter-partition messages. Verb field 701 contains the action being requested by the message, and may be any of AGT_CALL, AGT_REPLY, AGT_RETURN, AGT_ERROR, AGT_DEBUG or AGT_TERMINATE. The first three of these are explained below; the others are self-explanatory and not significant to the invention herein. Flag field 702 contains the same information as the flag field 612 of the agent status record. Target module identifier field 703 and target procedure identifier field 704 contain the module and procedure of the message destination, respectively. Origin partition identifier 705 contains the identifier of the sender's partition. Marshalled parameters field 706 contains an encoding of passed parameters.

In the preferred embodiment, parameter encoding uses a method of recursive descent traversal of hierarchical data structures until primitive simple data elements are identified, which are then passed in a machine-independent format to the other processor. This operation is known as parameter marshalling. The inverse operation occurs on parameter decoding where hierarchical data structures are built from primitive data elements which are recovered from their machine-independent format. This operation is known as parameter unmarshalling. The technique of parameter marshalling/unmarshalling is known in the art, and the precise details are not repeated here. Any of various other parameter encoding/decoding schemes known in the art could also be used.

Figure 8:
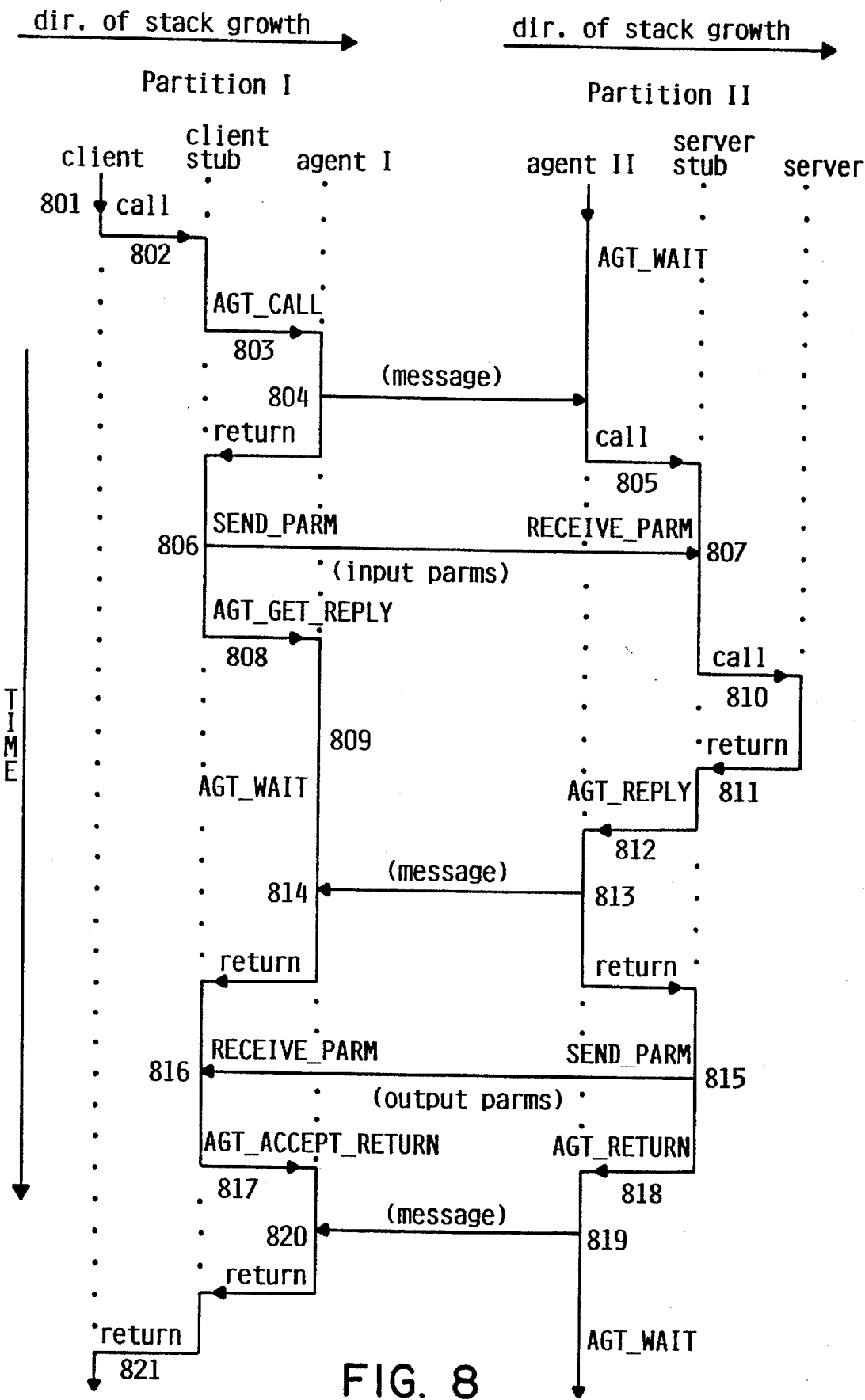
FIG. 8 shows the transfer of control during the steps of a single remote Procedure call and return.
Figure 9:
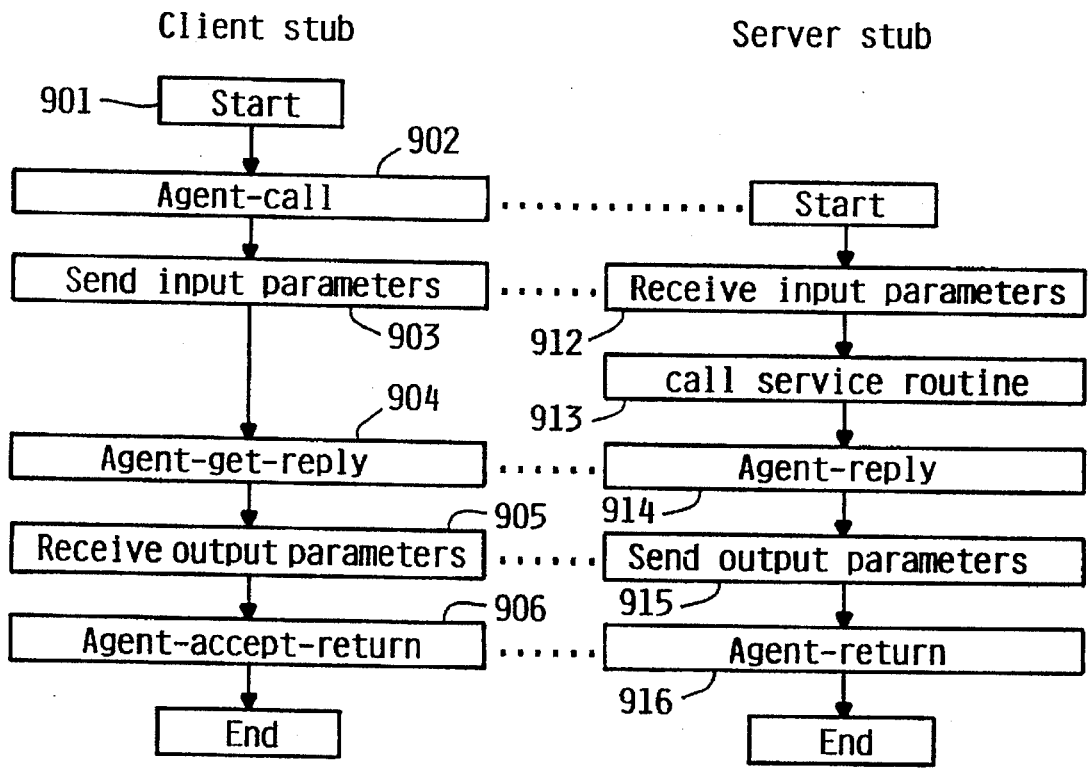
FIG. 9 is a flowchart of steps performed by c-stubs and s-stubs as part of a single remote procedure call and return according to the preferred embodiment.

The steps of the remote call procedure will now be described in detail. FIG. 8 shows from a conceptual level the transfer of control between client, stubs, agents and server during the steps of a single remote procedure call and return. FIG. 9 is a flowchart of steps performed by client and server stubs as part of a single remote procedure call and return. FIG. 10 is a flowchart of steps performs by agents.

Immediately prior to commencing a remote procedure call, the state of the program is as follows. The partition that is about to issue the remote procedure call is executing in the client procedure that will issue the call. All other partitions are executing in their respective agents, which are in the AGT_WAIT state, waiting for events to be signalled from remote partitions. This state is represented in FIG. 8 at 801. For the purpose of responding to remote calls, the agent may also be in the AGT_GET_REPLY or AGT_ACCEPT RETURN state. However, in the following explanation the AGT_WAIT state represents all three states.

When the client procedure is ready to invoke a remote server, it issues a local procedure call to the local client stub of that server, 802, which to the client is just like any other local procedure call. This call starts the c-stub running 901, which then issues a call to the local agent with an AGT_CALL event 803,902, requesting it to invoke the remote server. The client agent establishes a remote connection and passes the AGT_CALL message to the server agent 804, which is waiting in the AGT_WAIT state.

FIG. 10A shows the action taken by the client agent upon receipt of the AGT_CALL event. The client agent first verifies status (whether it is legal to receive an AGT_CALL in current state) 1001. If status is legal, current agent status is saved on agent status stack 601 at step 1002. The agent then constructs a message, using the verb AGT_CALL, target module and procedure identifiers, and origin local partition identifier at step 1003, sets new agent status at 1004, and sends the message to the target partition 1005. When the server agent has received the message, the client agent returns control to the c-stub.

FIG. 10B shows the action taken by the server agent upon receipt of the AGT_CALL message from the client agent. The server agent initially sets its state to AGT_NULL_CODE code before any message arrives while in the AGT_WAIT state 1011. The agent then receives the message in its buffer 1012 and examines the verb. If the verb is not AGT_CALL 1013 and not AGT_TERMINATE 1014, an error is signalled. If the verb is AGT_TERMINATE, the agent process terminates its partition. If the verb is AGT_CALL, the receiving agent pushes its current status on the agent status stack 1015, sets new status flags from the message header 1016, sets its state to AGT_IN SERVICE 1017, and dispatches service by calling the local server stub 1018, 805, causing the s-stub to begin 911. Status will be restored from the agent status stack later when the server completes and returns 1019.

With control returned to the c-stub in the client partition and the s-stub initiated in the server partition, the c-stub sends the input parameters 903, 806 to the s-stub, which receives them 912, 807. After all input parameters have been sent, the c-stub calls the client agent with an AGT_GET_REPLY event 904, 808, signalling it to wait for the remote service to return. The client agent then enters the AGT_WAIT state 809, from which it can receive either of two events from some remote agent: AGT_REPLY or AGT_CALL. The AGT_REPLY event will arrive from the server agent of the remote procedure call currently in progress after the server procedure has finished. The AGT_CALL event (if any) will arrive as part of a new remote procedure call for some local service, which is nested within the original remote procedure call. Such a call could arrive from any other agent.

After the server stub receives all input parameters, it issues a local call to the server procedure 810, 913, passing it the parameters in the same manner as any local call. The server procedure then executes. The server procedure could issue a nested call to another local or remote procedure, using the procedure described above, but in this example only the single call and return will be described. When the server procedure is finished, it returns to the s-stub 811.

The s-stub invokes the server agent with an AGT_REPLY event 812, 914, signalling it to alert the client that the service has been completed. FIG. 10C shows the action taken by the server agent on issuing an AGT_REPLY event, represented in FIG. 8 at 813. The server agent first verifies status (whether it is legal to issue an AGT_REPLY in current state) 1021. If status is legal, the agent constructs a message, using the verb AGT_REPLY, and target module and procedure identifiers, and origin partition identifier from the current agent status at step 1022. The server agent then sends the message to the client partition 1023, and sets its status to AGT_IN_SERVICE 1024. When the message has been received, server agent returns to the s-stub.

Figure 10F:
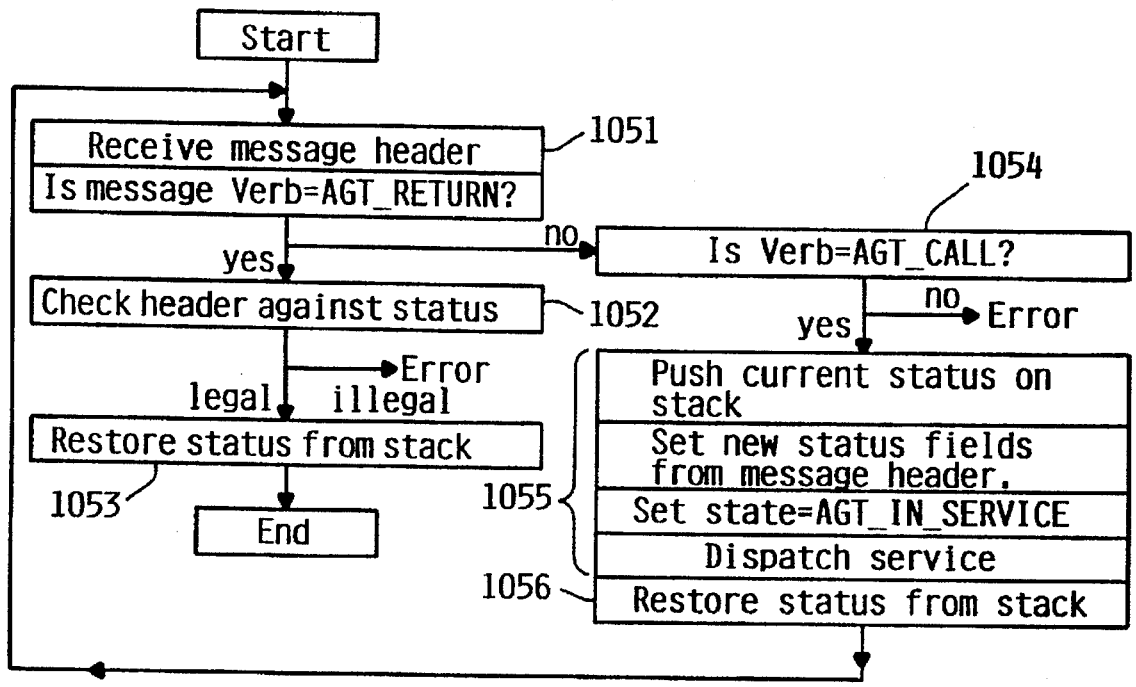
Figure 10D:
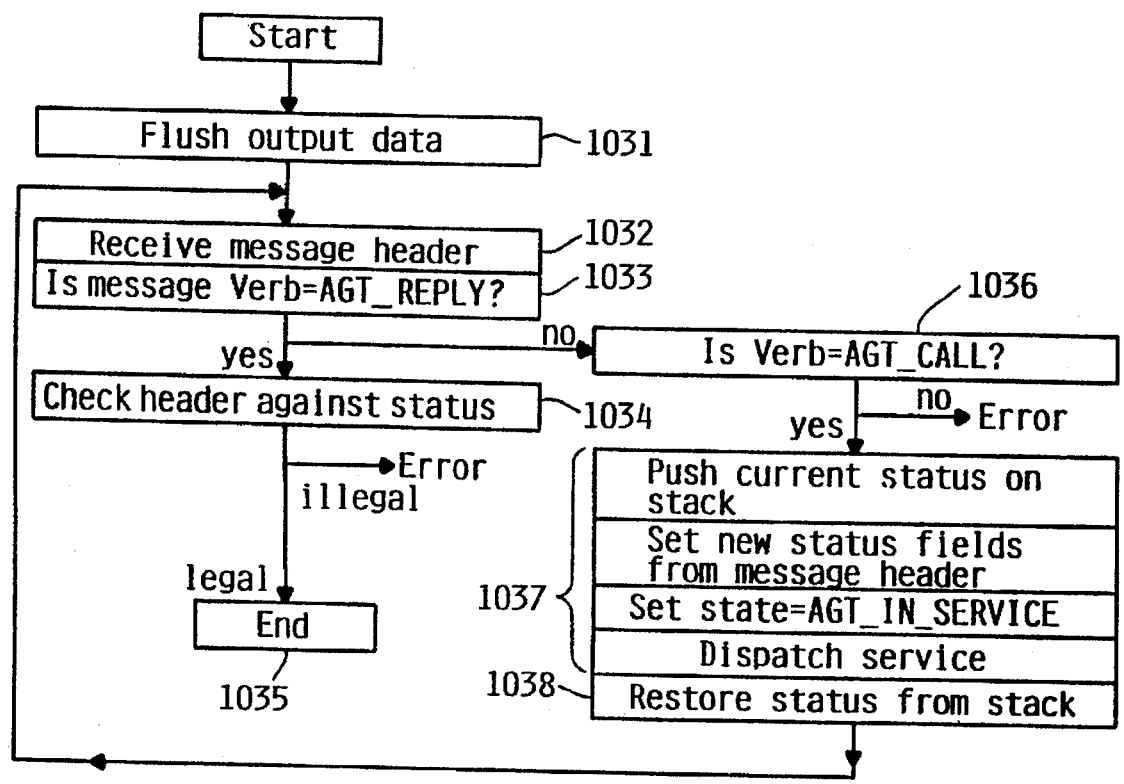

FIG. 10D shows the action taken by the client agent upon receipt of the AGT_REPLY message from the server agent, represented in FIG. 8 at 814. When the client agent finishes invoking the server, it flushes its output data 1031 and enters the wait state, waiting for a message from another partition as previously described. When a message arrives, it is placed in the agent's buffer 1032 and the verb is examined. If the verb is AGT_REPLY 1033, it verifies status 1034. If the AGT_REPLY message is legal for the current status, the agent returns to the local c-stub 1035, 904. If the verb is AGT_CALL 1036, a nested remote procedure call is indicated. The agent will push current status on the agent status stack, reset the status fields from the message header data, set its state to AGT_IN_SERVICE, and dispatch service by invoking the appropriate s-stub 1037. When local service is complete, it restores its previous status from the agent status stack 1038 and re-enters the wait state.

When control is returned to the local c-stub from the client agent and s-stub from the server agent, the s-stub sends the output parameters 815, 915 to the c-stub, which receives them 816, 905. After all output parameters have been received, the c-stub calls the client agent with an AGT_ACCEPT_RETURN event 817, 906, signalling it to expect the return of the remote procedure call from the server agent. At approximately the same time, the s-stub returns control to the server agent with an AGT_RETURN event 818, 916, signalling it to return the remote procedure call to the client agent. The s-stub has then finished its role.

Figure 10E:
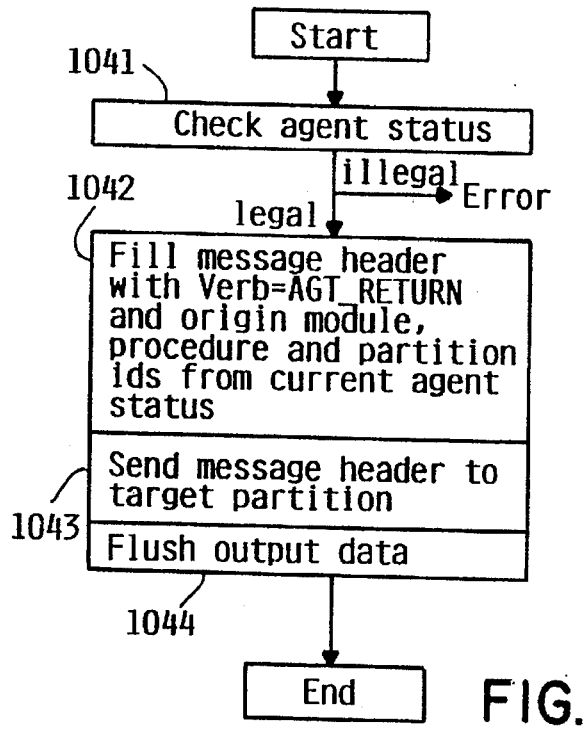

FIG. 10E shows the action taken by the server agent upon issuing an AGT_RETURN event, signalling return from the s-stub. The server agent verifies status 1041. If it is legal to issue the AGT_RETURN given current status, the agent constructs a message to the client agent, putting the verb AGT_RETURN in the message header, along with origin module, procedure and partition identifiers from its current status 1042. The agent then sends the message to the client agent 819, 1043. When the message has been transmitted, the server agent flushes its output buffer 1044 and returns control to the s-stub. The s-stub completes its execution as well and returns control to its dispatcher, which is an agent in an AGT_WAIT state, while performing either of the events AGT_WAIT, AGT_GET_REPLY, or AGT_ACCEPT_RETURN. At this point, the agent is awaiting another call.

FIG. 10F shows the action taken by the client agent upon receipt of the AGT_RETURN message, represented in FIG. 8 at 820. After the client agent receives the call from the c-stub signalling it to expect return of the remote procedure call, the client agent is in a wait state. When a message is received, it is read into the buffer 1051 and the verb is examined. If the verb is AGT_RETURN, the agent verifies status 1052. If it is legal to receive the message, the agent restores its status from the agent status stack 1053, and returns to the c-stub. While waiting for the AGT_RETURN, it is possible to receive another (nested) AGT_CALL message, as shown at 1054. In this case, the agent will push current status on the agent status stack, reset the status fields from the message header data, set its state to AGT_IN_SERVICE, and dispatch service by invoking the appropriate s-stub 1055. When local service is complete, it restores its previous status from the agent status stack 1056 and re-enters the wait state. When the local c-stub receives the return from the agent, it returns the parameters (local return) to the client procedure 821.

Figure 11:
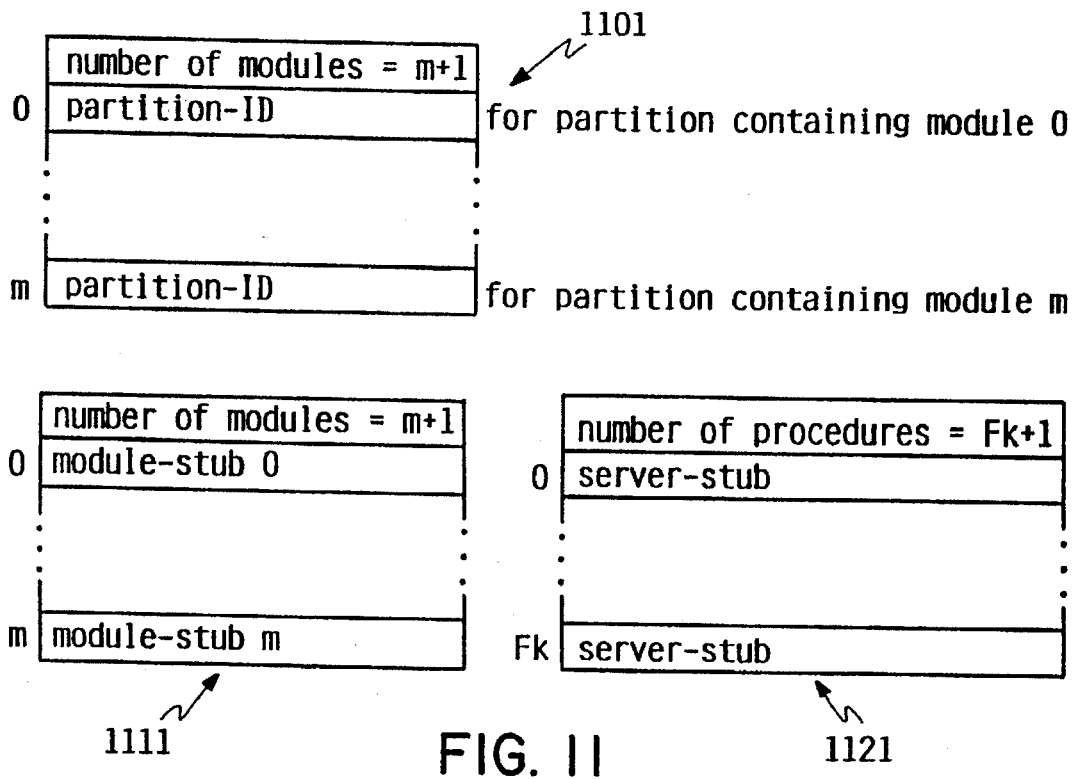
FIG. 11 shows the structure of tables which maintain routing information for remote procedure calls according to the preferred embodiment.

Each partition maintains several tables containing routing information for performing remote calls, as shown in FIG. 11. These comprise module-to-partition mapping table 1101, module dispatch table 1111, and procedure dispatch table 1121. Partitions are designated with a number from 0 to n, where there are n+1 total partitions. The main partition is designated number 0. Modules are designated with a number from 0 to m, where there are m+1 total modules. Module-to-partition table 1101 contains a number of entries equal to the number of modules, each entry containing the identifier of the partition containing the module which indexes the entry. Table 1101 is duplicated in each partition, enabling the agent to route a remote procedure call to the correct partition. Module dispatch table 1111 contains a number of entries equal to the number of modules, each entry containing the local address of a special module-stub. Since not all modules are contained in any one partition, module dispatch table contains the local address of an error handling procedure for those modules which are not contained in the local partition. Although each partition has a module dispatch table 1111, the entries will be different for each partition. Each module-stub contains a procedure dispatch table 1121. The procedure dispatch table contains a number of entries equal to the number of server procedures in the module, each entry containing the local address of the procedure s-stub. When the agent receives a call for service from a remote partition, it obtains the module-stub address from table 1111, then invokes the module-stub, which obtains the s-stub address from table 1121, and then invokes the s-stub.

In accordance with this invention, different portions of a program will be contained in the local storages of different processors. When a program begins execution (in its main partition), there must be some mechanism for assuring that program modules in secondary partitions will be loaded as necessary. In the preferred embodiment, separate loader/starter processes perform this task.

Figure 12:
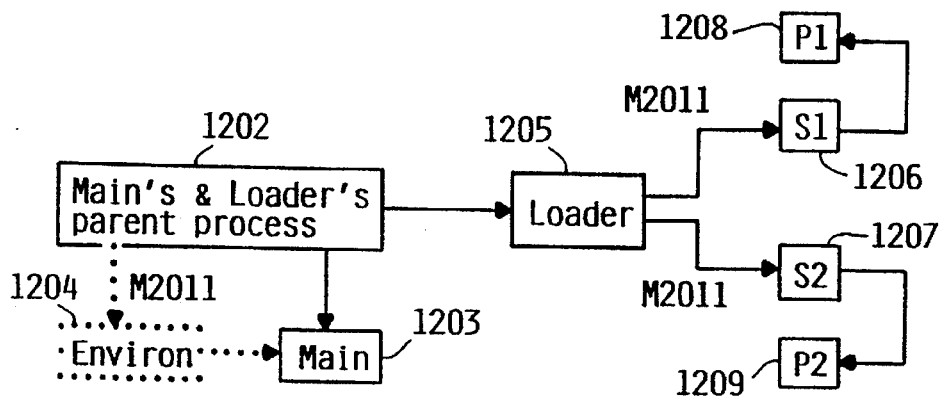
FIG. 12 shows the loader/starter mechanism according to the preferred embodiment.
Figure 12:
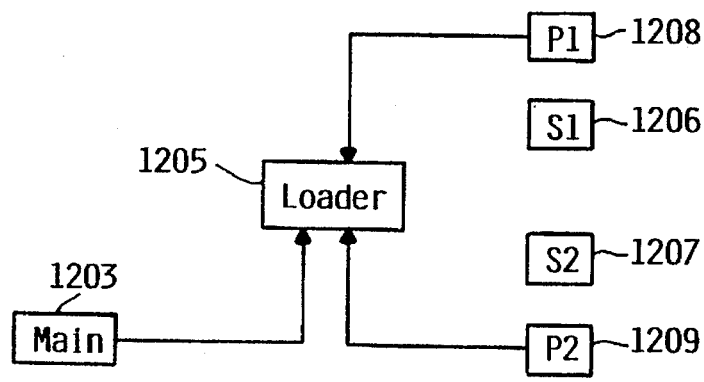

FIG. 12 shows the loader/starter mechanism. The loader 1205, starters 1206, 1207, main partition 1203 and secondary partitions 1208, 1209 each owns a master port, allocated to it as it starts executing. The master port is necessary for establishing interpartition connections at a low level. Each starter 1206, 1207 is an operating system process, one starter per processor; its master port name is known to the loader. The starter 1206, 1207 starts the respective partition 1208, 1209 upon command from loader 1205. The loader 1205 may be contained in the same local address space as the main partition, or may be on a different processor's address space. When a parent process 1202 invokes the program (in main partition 1203), it invokes the loader at the same time. The parent process passes a master port number of the loader ("M2011" in FIG. 12) to the main partition through the environment 1204. The "environment" means any of various mechanisms that can be used to pass the port number, such as an environment variable, external file, or other means. Loader 1205 calls each starter, passing it the loader's master port name. The starters then start each respective secondary partition. Starting the partition requires creation of the program stack for the secondary partition, with an activation block for the agent process at the bottom of the stack. The agent process of the secondary partition will be started in the AGT_WAIT state. The main and secondary partitions establish connections with the loader, using the previously supplied loader master port name, and send the loader the master port name of the respective partitions. The loader then distributes the port names to all other partitions.

Although in the preferred embodiment, all partitions in a program are loaded and linked when the main partition is started, in an alternative embodiment it would be possible to delay loading until a remote procedure call invokes a procedure contained in an unloaded partition (demand loading). In this alternative embodiment, each partition would maintain a vector containing the master ports of previously loaded partitions. When a remote procedure call is to be made, the client partition first checks the vector to verify that the target partition has been loaded. If the target partition is not loaded, the starter of the target processor starts the target partition upon command from the loading function within the calling partition. Only one partition is started at a time, but otherwise the demand loader functions as for pre-loading of all partitions as in the preferred embodiment.

In the preferred embodiment, each separately compiled code module is allocated to a processor based on performance or other considerations. Allocation is done at the module level, not at the procedure level, to avoid any modification to source code. If it is desired to allocate modules at the individual procedure level, it would be possible (in most computer languages) to separately compile each procedure. In an alternative embodiment, compiler directives could be included in the source code, which would permit different procedures within a single module to be compiled into separate modules for use on separate partitions.

In the preferred embodiment, this invention is used to facilitate a numeric-intensive accelerator system attached to a general purpose computer system, in which the accelerator functions primarily as a slave system. However, many alternative embodiments of system configuration and usage are possible. For example, all processors may be identical, but each having access to different local databases. The communication links may be more remote or more close than employed in the preferred embodiment. For example, the different processors may be linked by any of various local area network technologies.

Although a specific embodiment of the invention has been disclosed along with certain alternatives, it will be recognized by those skilled in the art that additional variations in form and detail may be made within the scope of the following claims.

What is claimed is:

1. A distributed processing apparatus for executing a program having a plurality of callable procedures, comprising:

a first processor coupled to a first local memory for executing procedures contained in said first local memory;

a second processor coupled to a second local memory for executing procedures contained in said second local memory;

means for communicating data between said first and second processors;

means for a first callable procedure of said program contained in said first local memory to call a second callable procedure of said program contained in said second local memory;

means for said second callable procedure to recursively call a callable procedure contained in said first local memory while executing on behalf of said first callable procedure.

2. The distributed processing apparatus of claim 1, further comprising:

means for maintaining a first program stack contained in said first local memory, said first program stack comprising one or more activation blocks, each activation block containing the state information of an instance of a procedure contained in said first local memory; and means for maintaining a second program stack contained in said second local memory, said second program stack comprising one or more activation blocks, each activation block containing the state information of an instance of a procedure contained in said second local memory.

3. The distributed processing apparatus of claim 1, further comprising:

means for calling an outer procedure of said program to commence execution of said program in said first processor;

means for automatically establishing a link, without prompting from an external command, between said first procedure and said second procedure, wherein said means for said first callable procedure to call said second callable procedure of is automatically enabled; and means for automatically establishing a link, without prompting from an external command, between said second procedure and a callable procedure contained in said first local memory, wherein said means for said second callable procedure to call a callable procedure contained in said first local memory while executing on behalf of said first callable procedure is automatically enabled.

4. A distributed processing apparatus for executing a program having a plurality of callable procedures, comprising:

a first processor coupled to a first local memory for executing procedures contained in said first local memory;

a second processor coupled to a second local memory for executing procedures contained in said second local memory;

means for communicating data between said first and second processors;

means for a first callable procedure of said program contained in said first local memory to call a second callable procedure of said program contained in said second local memory, said means comprising:

(a) means for said first callable procedure to issue a first local call to a first c-stub module, said first c-stub module being contained in said first local memory and representing said second callable procedure;

(b) means, responsive to said first local call, for said first c-stub module to communicate data contained in said first local call to a first s-stub module, said first s-stub module contained in said second local memory and representing said second callable procedure;

(c) means, responsive to said means for said first c-stub module to communicate data contained in said first local call to said first s-stub module, for said first s-stub module to issue a second local call to said second callable procedure on behalf of said first callable procedure; and means for said second callable procedure to call a callable procedure contained in said first local memory while executing on behalf of said first callable procedure, said means comprising:

(a) means for said second callable procedure to issue a third local call to a second c-stub module while said second callable procedure is executing on behalf of said first callable procedure, said second c-stub module being contained in said second local memory and representing said procedure contained in said first local memory which may be called by said second callable procedure while executing on behalf of said first callable procedure;

(b) means, responsive to said third local call, for said second c-stub module to communicate data contained in said third local call to a second s-stub module, said second s-stub module being contained in said first local memory and representing said procedure contained in said first local memory which may be called by said second callable procedure while executing on behalf of said first callable procedure;

(c) means, responsive to said means for said second c-stub module to communicate data contained in said third local call to said second s-stub module, for said second s-stub module to issue a fourth local call to said procedure contained in said first local memory which may be called by said second callable procedure while executing on behalf of said first callable procedure wherein said fourth local call is issued on behalf of said second callable procedure.

5. The distributed processing apparatus of claim 4, wherein said means for said second callable procedure to call a procedure contained in said first local memory comprises means for said second callable procedure to recursively call said first callable procedure.

6. The distributed processing apparatus of claim 4, further comprising:

means for maintaining a first program stack contained in said first local memory, said first program stack comprising one or more activation blocks, wherein each instance of a procedure contained in said first local memory, each instance of a c-stub contained in said first local memory, and each instance of an s-stub contained in said first local memory, is represented by a unique activation block in said first program stack containing the state information of said instance; and means for maintaining a second program stack contained in said second local memory, said second program stack comprising one or more activation blocks, wherein each instance of a procedure contained in said second local memory, each instance of a c-stub contained in said second local memory, and each instance of an s-stub contained in said second local memory, is represented by a unique activation block in said first program stack containing the state information of said instance.

7. The distributed processing apparatus of claim 4, further comprising:

means for calling an outer procedure of said program to commence execution of said program in said first processor;

means for automatically establishing a link, without prompting from an external command, between said first procedure and said second procedure, wherein said means for said first callable procedure to call said second callable procedure of is automatically enabled; and means for automatically establishing a link, without prompting from an external command, between said second procedure and a callable procedure contained in said first local memory, wherein said means for said second callable procedure to call a callable procedure contained in said first local memory while executing on behalf of said first callable procedure is automatically enabled.

8. A method for executing a computer program on a multi-processor system, comprising the steps of:

allocating a first set of callable procedures contained in said program to a first processor;

allocating a second set of callable procedures contained in said program to a second processor;

executing, with said first processor, a first callable procedure contained in said first set of callable procedures;

calling, from said first callable procedure, a callable procedure contained in said second set of callable procedures while performing said step of executing, with said first processor, a first callable procedure;

executing, with said second processor, a second callable procedure on behalf of said first callable procedure; and recursively calling, from said second callable procedure, a callable procedure contained in said first set of callable procedures while performing said step of executing, with said second processor, said second callable procedure.

9. The method of claim 8, further comprising the steps of:

maintaining, in a first local memory of said first processor, a first program stack, said first program stack comprising one or more activation blocks, each activation block containing state information of an instance of a procedure contained in said first local memory; and maintaining, in a second local memory of said second processor, a second program stack, said second program stack comprising one or more activation blocks, each activation block containing state information of an instance of a procedure contained in said second local memory.

10. The method of claim 8, further comprising the steps of:

calling an outer procedure of said program to commence execution of said program in said first processor;

automatically establishing a link, without prompting from an external command, between said first procedure and a callable procedure contained in said second set, wherein said step of calling, from said first callable procedure, a callable procedure contained in said second set of callable procedures is automatically enabled; and automatically establishing a link, without prompting from an external command, between said second procedure and a callable procedure contained in said first set of callable procedures, wherein said step of calling, from said second callable procedure, a callable procedure contained in said first set of callable procedures is automatically enabled.

11. A method for executing a computer program on a multi-processor system, comprising the steps of:

allocating a first set of callable procedures contained in said program to a first processor;

allocating a second set of callable procedures contained in said program to a second processor;

executing, with said first processor, a first callable procedure contained in said first set of callable procedures;

calling, from said first callable procedure, a callable procedure contained in said second set of callable procedures while performing said step of executing, with said first processor, a first callable procedure, wherein said step of calling, from said first callable procedure, a callable procedure in said second set comprises the steps of:

(a) issuing a first local call from said first callable procedure to a first c-stub module contained in a first local memory of said first processor;

(b) communicating said first local call to a first s-stub module contained in a second local memory of said second processor;

(c) issuing a second local call from said first s-stub module to a callable procedure in said second set on behalf of said first callable procedure;

executing, with said second processor, a second callable procedure on behalf of said first callable procedure; and calling, from said second callable procedure, a callable procedure contained in said first set of callable procedures while performing said step of executing, with said second processor, said second callable procedure, wherein said step of calling, from said second callable procedure, a callable procedure contained in said first set of callable procedures comprises the steps of:

(d) issuing a third local call from said second callable procedure to a second c-stub module contained in said second local memory;

(e) communicating said third local call to a second s-stub module contained in said first local memory;

(f) issuing a fourth local call from said second s-stub module to a callable procedure in said first set on behalf of said second callable procedure.

12. The method of claim 11, further comprising the steps of:

maintaining, in said first local memory of said first processor, a first program stack, said first program stack comprising one or more activation blocks, wherein each instance of a procedure contained in said first local memory, each instance of a c-stub contained in said first local memory, and each instance of an s-stub contained in said first local memory, is represented by a unique activation block in said first program stack containing the state information of said instance; and maintaining, in said second local memory of said second processor, a second program stack, said second program stack comprising one or more activation blocks, wherein each instance of a procedure contained in said second local memory, each instance of a c-stub contained in said second local memory, and each instance of an s-stub contained in said second local memory, is represented by a unique activation block in said second program stack containing the state information of said instance.

13. A method for executing a single-thread computer program having a plurality of callable procedures, comprising the steps of:

allocating each of said plurality of callable procedures in said program to one of a plurality of sets of callable procedures;

storing callable procedures of a first set of said plurality of sets of callable procedures in a first local memory of a first processor of a multi-processor computer system;

storing callable procedures of a second set of said plurality of sets of callable procedures in a second local memory of a second processor of said multi-processor computer system;

executing said program on said multi-processor system, wherein said executing step comprises the steps of:

(a) executing callable procedures contained in said first set of callable procedures on said first processor, wherein at least one procedure in said first set calls a procedure in said second set while executing on behalf of a procedure in said second set; and (b) executing callable procedures contained in said second set of callable procedures on said second processor, wherein at least one procedure in said second set calls a procedure in said first set while executing on behalf of a procedure in said first set.

14. The method of claim 13, wherein said step of allocating each of said plurality of callable procedures in said program to one of a plurality of sets of callable procedures comprises the step of:

determining, with respect to each said callable procedure, which processor of said multi-processor system should execute the callable procedure, wherein said determination is made without reference to a calling history of said program.

15. The method of claim 14, wherein said first processor executes callable procedures of a first type more efficiently than said second processor, and said second processor executes callable procedures of a second type more efficiently than said first processor, and wherein said determining step determines that callable procedures of said first type should execute on said first processor, and that callable procedures of said second type should execute on said second processor.

16. The method of claim 15, wherein said first processor is a general-purpose commercial transaction processor and said second processor is a numeric-intensive processor.

17. The method of claim 13, wherein said step of executing said program on said multi-processor system comprises the steps of:

calling an outer procedure of said program to commence execution of said program in said first processor;

automatically establishing a link, without prompting from an external command, between a procedure in said first set of callable procedures and a procedure in said second set, wherein the procedure in said first set is automatically enabled to call the procedure in said second set; and automatically establishing a link, without prompting from an external command, between a procedure in said second set of callable procedures and a procedure in said first set, wherein the procedure in said first set is automatically enabled to call the procedure in said second set.

18. A method for adapting a single-thread computer program having a plurality of callable procedures and originally written to execute on a single processor system to execute on a multi-processor system, said method comprising the machine-executed steps of:

creating a first partition of said computer program, said first partition comprising a first set of callable procedures;

creating a second partition of said computer program, said second partition comprising a second set of callable procedures, wherein said first and second sets are disjoint;

wherein a callable procedure in said first set of callable procedures contains a call to a callable procedure in said second set of callable procedures;

wherein a callable procedure in said second set of callable procedures contains a call to a callable procedure in said first set of callable procedures;

placing in said first partition means for a receiving a local call from a procedure in said first set to a procedure in said second set;

placing in said second partition means for issuing a local call to a procedure in said second set on behalf of a procedure in said first set;

placing in said second partition means for receiving a local call from a procedure in said second set to a procedure in said second set; and placing in said first partition means for issuing a local call to a procedure in said first set on behalf of a procedure in said second set.

19. The method of claim 18, wherein said multi-processor system comprises a first processor and a second processor, wherein said first processor executes callable procedures of a first type more efficiently than said second processor, and said second processor executes callable procedures of a second type more efficiently than said first processor, and wherein said steps of creating a first partition and creating a second partition allocate procedures of said first type to said first partition and procedures of said second type to said second partition.

20. The method of claim 19, wherein said first processor is a general-purpose commercial transaction processor and said second processor is a numeric-intensive processor.

21. A program product for execution on a multi-processor computer system, said program product having a plurality of computer executable instructions recorded on a computer readable recording medium, said plurality of computer executable instructions representing a computer program for execution in single-thread mode, said program product comprising:

a first partition of said computer program for execution on a first processor of said multi-processor system, said first partition comprising a plurality of callable procedures executable on said first processor;

a second partition of said computer program for execution on a second processor of said multi-processor system, said second partition comprising a plurality of callable procedures executable on said second processor;

means in a first callable procedure contained in said first partition, when executing on said first processor of said multi-processor system, for issuing a call to a callable procedure in said second partition while executing on behalf of a callable procedure in said second partition;

means in a second callable procedure contained in said second partition, when executing on said second processor of said multi-processor system, for issuing a call to a callable procedure contained in said first partition while executing on behalf of said first callable procedure.

22. The program product of claim 21, wherein said second callable procedure comprises means for recursively calling said first callable procedure.

23. The program product of claim 21, further comprising:

a first c-stub module contained in said first partition and representing a callable procedure contained in said second partition;

a first s-stub module contained in said second partition and representing said first callable procedure;

a second c-stub module contained in said second partition and representing a callable procedure contained in said first partition;

a second s-stub module contained in said first partition and representing said second callable procedure;

wherein said means, contained in said first callable procedure, for issuing a call to a procedure in said second partition, comprises means for issuing a first local call to said first c-stub module;

wherein said first c-stub module comprises means for sending data to said first s-stub module in response to said first local call;

wherein said first s-stub module comprises means for issuing a second local call to a callable procedure contained in said second partition, on behalf of said first callable procedure;

wherein said means, contained in said second callable procedure, for issuing a call to a callable procedure contained in said first partition while executing on behalf of said first callable procedure, comprises means for issuing a third local call to said second c-stub module;

wherein said second c-stub module comprises means for sending data to said second s-stub module in response to said third local call; and wherein said second s-stub module comprises means for issuing a fourth local call to a callable procedure contained in said first partition on behalf of said second callable procedure.

24. A distributed processing apparatus for executing a program having a plurality of callable procedures, comprising:

a first processor coupled to a first local memory for executing procedures contained in said first local memory;

a second processor coupled to a second local memory for executing procedures contained in said second local memory;

means for communicating data between said first and second processors;

means for maintaining a first program stack contained in said first local memory, said first program stack comprising one or more activation blocks, each activation block containing state information of an instance of a procedure contained in said first local memory;

means for maintaining a second program stack contained in said second local memory, said second program stack comprising one or more activation blocks, each activation block containing state information of an instance of a procedure contained in said second local memory;

means for a first instance of a callable procedure of said program contained in said first local memory to call a second instance of a callable procedure of said program contained in said second local memory;

means for said second instance of a callable procedure to call a third instance of a callable procedure contained in said first local memory while executing on behalf of said first instance of a callable procedure; and means for said third instance of a callable procedure to call an instance of a callable procedure contained in said second local memory while executing on behalf of said first and second instances of callable procedures.

25. The distributed processing apparatus of claim 24, wherein said means for a third instance of a callable procedure to call an instance of a callable procedure in said second local memory comprises means for said third instance to recursively call a procedure in said second local memory.

26. The distributed processing apparatus of claim 24, further comprising means for instances of callable procedures contained in said first and second local memories to alternately call instances of callable procedures contained in the respective opposite local memory, up to and including an Nth instance of a callable procedure contained in the $(((N-1) \bmod 2)+1)$ ordered local memory to call an instance of a callable procedure contained in the $((N \bmod 2)+1)$ ordered local memory while executing on behalf of callable procedure instances 1 through $(N-1)$, wherein the value of N is limited only by a maximum size of said first and second program stacks.

27. A distributed processing apparatus for executing a program having a plurality of callable procedures, comprising:

a first processor coupled to a first local memory for executing a first set of callable procedures of said program from said first local memory;

a second processor coupled to a second local memory for executing a second set of callable procedures of said program from said second local memory;

a communications connection for communicating data between said first and second processors;

means for maintaining a first program stack contained in said first local memory, said first program stack containing state information for each instance of a procedure of said first set;

means for maintaining a second program stack contained in said second local memory, said second program stack containing state information for each instance of a procedure of said second set;

a bi-directional peer-to-peer remote procedure call mechanism, said remote procedure call mechanism enabling a callable first procedure executing on said first processor and contained in said first set of callable procedures to call a callable procedure in said second set of callable procedures for execution on said second processor, while said first procedure is executing on behalf of a procedure in said second set of callable procedures, said remote procedure call mechanism enabling a callable second procedure executing on said second processor and contained in said second set of callable procedures to call a callable procedure in said first set of callable procedures for execution on said first processor, while said second procedure is executing on behalf of a procedure in said first set of callable procedures; and wherein said means for maintaining a first program stack and said means for maintaining a second program stack update said respective first and second program stacks in response to a remote procedure call executed by said remote procedure call mechanism.

28. The distributed processing apparatus of claim 27, wherein, said first program stack is not updated in response to a local call of a callable procedure in said second set by a callable procedure of said second set executing on said second processor; and said second program stack is not updated in response to a local call of a callable procedure in said first set by a callable procedure of said first set executing on said first processor.

29. The distributed processing apparatus of claim 27, wherein said remote procedure call mechanism enables callable procedures contained in said first and second local memories to alternately call instances of callable procedures contained in the respective opposite local memory, up to and including an Nth instance of a callable procedure contained in the (((N−1) modulo 2)+1) ordered local memory to call an instance of a callable procedure contained in the ((N modulo 2)+1) ordered local memory while executing on behalf of callable procedure instances 1 through (N−1), wherein the value of N is limited only by a maximum size of said first and second program stacks.

30. A distributed processing apparatus for executing a program having a plurality of callable procedures, comprising:

a first processor coupled to a first local memory for executing procedures contained in said first local memory;

a second processor coupled to a second local memory for executing procedures contained in said second local memory;

means for communicating data between said first and second processors;

means for a first callable procedure of said program contained in said first local memory to make a first local call to a second callable procedure of said program contained in said second local memory;

means for said second callable procedure to make a second local call a callable procedure contained in said first local memory while executing on behalf of said first callable procedure.

31. A method for executing a computer program on a multi-processor system, comprising the steps of:

allocating a first set of callable procedures contained in said program to a first processor of said multi-processor system;

allocating a second set of callable procedures contained in said program to a second processor of said multi-processor system;

executing, with said first processor, a first callable procedure contained in said first set of callable procedures;

calling, from said first callable procedure, a callable procedure contained in said second set of callable procedures while performing said step of executing, with said first processor, a first callable procedure, wherein said calling step is performed via a local call using said first and second processors;

executing, with said second processor, a second callable procedure on behalf of said first callable procedure; and recursively calling, from said second callable procedure, a callable procedure contained in said first set of callable procedures while performing said step of executing, with said second processor, said second callable procedure, wherein said recursively calling step is performed via a local call using said first and second processors.

* * * * *

UNITED STATES PATENT AND TRADEMARK OFFICE
CERTIFICATE OF CORRECTION

PATENT NO.   : 5,659,701

DATED        : August 19, 1997

INVENTOR(S)  : Neta Jacob Amit, et al.

It is certified that error appears in the above-identified patent and that said Letters Patent is hereby corrected as shown below:

In the claims (column 14, lines 4-22), claim 3 should be deleted and the following substituted therefor:

-- 3. The distributed processing apparatus of claim 1, further comprising:

means for calling an outer procedure of said program to commence execution of said program in said first processor;

means for automatically establishing a first link between said first procedure and said second procedure, said means for automatically establishing a first link establishing said first link without prompting from an external command, wherein said means for said first callable procedure to call said second callable procedure of is automatically enabled; and means for automatically establishing a second link between said second procedure and a callable procedure contained in said first local memory, said means for automatically establishing a second link establishing said second link without prompting from an external command, wherein said means for said second callable procedure to call a callable procedure contained in said first local memory while executing on behalf of said first callable procedure is automatically enabled. --

UNITED STATES PATENT AND TRADEMARK OFFICE
CERTIFICATE OF CORRECTION

Page 2 of 5

PATENT NO. : 5,659,701

DATED : August 19, 1997

INVENTOR(S) : Neta Jacob Amit, et al.

It is certified that error appears in the above-identified patent and that said Letters Patent is hereby corrected as shown below:

In the claims (column 15, lines 45-63), claim 7 should be deleted and the following substituted therefor:

-- 7. The distributed processing apparatus of claim 4, further comprising:

means for calling an outer procedure of said program to commence execution of said program in said first processor;

means for automatically establishing a first link between said first procedure and said second procedure, said means for automatically establishing a first link establishing said first link without prompting from an external command, wherein said means for said first callable procedure to call said second callable procedure of is automatically enabled; and means for automatically establishing a second link between said second procedure and a callable procedure contained in said first local memory, said means for automatically establishing a second link establishing said second link without prompting from an external command, wherein said means for said second callable procedure to call a callable procedure contained in said first local memory while executing on behalf of said first callable procedure is automatically enabled. --

In the claims (column 15, line 64 through column 16, line 15), claim 8 should be deleted and the following substituted therefor:

-- 8. A method for executing a computer program on a multi-processor system, comprising the steps of:

allocating a first set of callable procedures contained in said program to a first processor of said multi-processor system;

UNITED STATES PATENT AND TRADEMARK OFFICE
CERTIFICATE OF CORRECTION

PATENT NO. : 5,659,701

DATED : August 19, 1997

INVENTOR(S) : Neta Jacob Amit, et al.

It is certified that error appears in the above-identified patent and that said Letters Patent is hereby corrected as shown below:

allocating a second set of callable procedures contained in said program to a second processor of said multi-processor system;

executing, with said first processor, a first callable procedure contained in said first set of callable procedures;

calling, from said first callable procedure, a callable procedure contained in said second set of callable procedures while performing said step of executing, with said first processor, a first callable procedure, wherein said calling step is performed using said first and second processors;

executing, with said second processor, a second callable procedure on behalf of said first callable procedure; and recursively calling, from said second callable procedure, a callable procedure contained in said first set of callable procedures while performing said step of executing, with said second processor, said second callable procedure, wherein said recursively calling step is performed using said first and second processors. --

In the claims (column 16, line 46 through column 17, line 20), claim 11 should be deleted and the following substituted therefor:

-- 11. A method for executing a computer program on a multi-processor system, comprising the steps of:

allocating a first set of callable procedures contained in said program to a first processor of said multi-processor system;

allocating a second set of callable procedures contained in said program to a second processor of said multi-processor system;

UNITED STATES PATENT AND TRADEMARK OFFICE
CERTIFICATE OF CORRECTION

Page 4 of 5

PATENT NO. : 5,659,701

DATED : August 19, 1997

INVENTOR(S) : Neta Jacob Amit, et al.

It is certified that error appears in the above-identified patent and that said Letters Patent is hereby corrected as shown below:

executing, with said first processor, a first callable procedure contained in said first set of callable procedures;

calling, from said first callable procedure, a callable procedure contained in said second set of callable procedures while performing said step of executing, with said first processor, a first callable procedure, wherein said step of calling, from said first callable procedure, a callable procedure in said second set comprises the steps of:

(a) issuing a first local call from said first callable procedure to a first c-stub module contained in a first local memory of said first processor, said step of issuing of first local call being performed with said first processor;

(b) communicating said first local call to a first s-stub module contained in a second local memory of said second processor;

(c) issuing a second local call from said first s-stub module to a callable procedure in said second set on behalf of said first callable procedure, said step of issuing a second local call being performed with said second processor;

executing, with said second processor, a second callable procedure on behalf of said first callable procedure; and calling, from said second callable procedure, a callable procedure contained in said first set of callable procedures while performing said step of executing, with said second processor, said second callable procedure, wherein said step of calling, from said second callable procedure, a callable procedure contained in said first set of callable procedures comprises the steps of:

UNITED STATES PATENT AND TRADEMARK OFFICE
CERTIFICATE OF CORRECTION

PATENT NO. : 5,659,701

DATED : August 19, 1997

INVENTOR(S) : Neta Jacob Amit, et al.

It is certified that error appears in the above-identified patent and that said Letters Patent is hereby corrected as shown below:

(d) issuing a third local call from said second callable
    procedure to a second c-stub module contained in said second
    local memory, said step of issuing a third local call being
    performed with said second processor;

(e) communicating said third local call to a second s-stub
    module contained in said first local memory;

(f) issuing a fourth local call from said second s-stub module
    to a callable procedure in said first set on behalf of said
    second callable procedure, said step of issuing a fourth local
    call being performed with said first processor. --

Signed and Sealed this

Twenty-fourth Day of March, 1998

Attest:

BRUCE LEHMAN

Attesting Officer

Commissioner of Patents and Trademarks